United States Patent
Ballu et al.

(10) Patent No.: US 10,561,062 B2
(45) Date of Patent: Feb. 18, 2020

(54) BEET CROP HARVESTING MACHINE, CORRESPONDING METHOD AND USE

(71) Applicant: EXEL INDUSTRIES, Epernay (FR)

(72) Inventors: Patrick Ballu, Paris (FR); Michael Gallmeier, Paris (FR)

(73) Assignee: Exel Industries, Epernay (FR)

( * ) Notice: Subject to any disclaimer, the term of this patent is extended or adjusted under 35 U.S.C. 154(b) by 0 days.

(21) Appl. No.: 15/474,711

(22) Filed: Mar. 30, 2017

(65) Prior Publication Data
US 2017/0311540 A1    Nov. 2, 2017

(30) Foreign Application Priority Data

Apr. 27, 2016  (EP) ..................................... 16305486

(51) Int. Cl.
| | | |
|---|---|---|
| *A01D 25/00* | (2006.01) | |
| *A01D 33/00* | (2006.01) | |
| *A01D 23/02* | (2006.01) | |
| *A01D 27/00* | (2006.01) | |
| *A01D 33/02* | (2006.01) | |
| *A01D 33/10* | (2006.01) | |

(52) U.S. Cl.
CPC ............. *A01D 33/00* (2013.01); *A01D 23/02* (2013.01); *A01D 25/00* (2013.01); *A01D 27/00* (2013.01); *A01D 33/02* (2013.01); *A01D 33/10* (2013.01); *A01D 2023/024* (2013.01)

(58) Field of Classification Search
CPC ........ A01D 33/02; A01D 33/08; A01D 25/00; A01D 25/005; A01D 27/00; A01D 27/04; A01D 31/00; A01D 33/00; A01D 23/02; A01D 33/10
See application file for complete search history.

(56) References Cited

U.S. PATENT DOCUMENTS

| | | | | |
|---|---|---|---|---|
| 3,240,276 A | * | 3/1966 | Conant ................... | A01D 31/00 134/68 |
| 4,206,242 A | * | 6/1980 | Freytag .................. | A23B 7/152 127/42 |
| 4,236,581 A | * | 12/1980 | Beckett ................ | A01D 25/048 111/186 |
| 4,355,433 A | * | 10/1982 | Dietrich ................. | A01D 33/08 134/115 R |
| 5,002,785 A | * | 3/1991 | Lew ........................ | A23B 7/00 426/302 |
| 5,192,369 A | * | 3/1993 | Pye .......................... | A01C 1/08 118/624 |

(Continued)

FOREIGN PATENT DOCUMENTS

| | | |
|---|---|---|
| DE | 20022619 U1 | 1/2002 |
| EP | 0026855 A1 | 4/1981 |

OTHER PUBLICATIONS

Extended European Search Report for EP Application 16305486.9 dated Oct. 31, 2016.

*Primary Examiner* — Robert E Pezzuto
(74) *Attorney, Agent, or Firm* — Thompson Coburn LLP; Steven M. Ritchey

(57) ABSTRACT

This root crop harvesting machine (2) is adapted to harvest root crop (4), in particular beet crop, the root crop harvesting machine comprising an uprooting device (14) adapted to uproot the root crop. The root crop harvesting machine comprises an applicator (40) device adapted to apply an agent (52) to the root crop.

20 Claims, 3 Drawing Sheets

(56) References Cited

U.S. PATENT DOCUMENTS

| | | | | |
|---|---|---|---|---|
| 6,123,968 | A * | 9/2000 | Mendez | A23B 7/154 |
| | | | | 426/310 |
| 6,797,300 | B2 * | 9/2004 | Mendez | A23B 7/154 |
| | | | | 426/310 |
| 8,163,091 | B2 * | 4/2012 | Frenzel | C13B 10/08 |
| | | | | 127/42 |
| 2003/0201333 | A1 * | 10/2003 | Oepping | A01D 43/14 |
| | | | | 239/1 |
| 2005/0077389 | A1 * | 4/2005 | Lebeda | A01D 43/14 |
| | | | | 239/302 |
| 2015/0014226 | A1 * | 1/2015 | Doppstadt | A01D 33/08 |
| | | | | 209/235 |
| 2016/0050845 | A1 * | 2/2016 | Nilson | A01D 17/10 |
| | | | | 171/1 |

* cited by examiner

BEET CROP HARVESTING MACHINE, CORRESPONDING METHOD AND USE

CROSS-REFERENCE TO RELATED APPLICATIONS

This application claims the benefit of European Patent Application EP 16305486.9, filed Apr. 27, 2016, which is incorporated herein by reference in its entirety.

BACKGROUND OF INVENTION

Beet crop harvesting machines are known in the state of the art.

These harvesting machines comprise generally a foliage cutting device for cutting the foliage off the root, an uprooting device for extracting the root crop out of the soil and a cleaning transport path for conveying the extracted root crop to a storage bunker and from there to a root crop heap.

A further root crop harvesting machine is known from http://www.ropa-maschinenbau.de/news/entsteinung-f%C3%BCr-biogasr%C3%BCben. This harvesting machine has a root crop bunker and a water bath for separating stones from root crop and for washing the root crop.

The root crop, in particular sugar beet, is generally stored at the side of the field on root crop heaps before being loaded onto trucks for further processing.

However, the cutting operation for cutting off the foliage and conveying the roots on the harvesting machine causes the root to have "wounds", i.e. locations at which the skin of the root is damaged or cut away. The root crop is prone to deterioration at these locations, for example rotting. In order to limit the likelihood of rotting, in the state of the art the root crop heap is covered with a foil or rot inhibitors are applied to the crop heap.

These solutions are not satisfactory and lead to an important loss of root crop due to rot or an important cost due to large amount of rot inhibitors to be used.

Furthermore, cleaning the root crop in the path from the uprooting to the root crop reservoir is not satisfactory.

SUMMARY OF INVENTION

The present invention has the goal to reduce the loss of root crop due to rot to be stored and this with economic means. Another object of the invention is therefore to render cleaning of the root crop easier and/or more efficient.

To this end, the object of the invention is a harvesting machine according to claim 1.

Further advantageous features are indicated in the dependent claims 2 to 13.

The object of the invention is also a method of cleaning and/or protection of root crop according to claim 14.

The object of the invention is also a use of the above mentioned harvesting machine, as claimed in claim 15.

BRIEF DESCRIPTION OF THE DRAWINGS

The invention will be better understood in light of the following description, which is for illustration only, and which refers to the annexed figures.

DETAILED DESCRIPTION OF INVENTION

Figure 1:
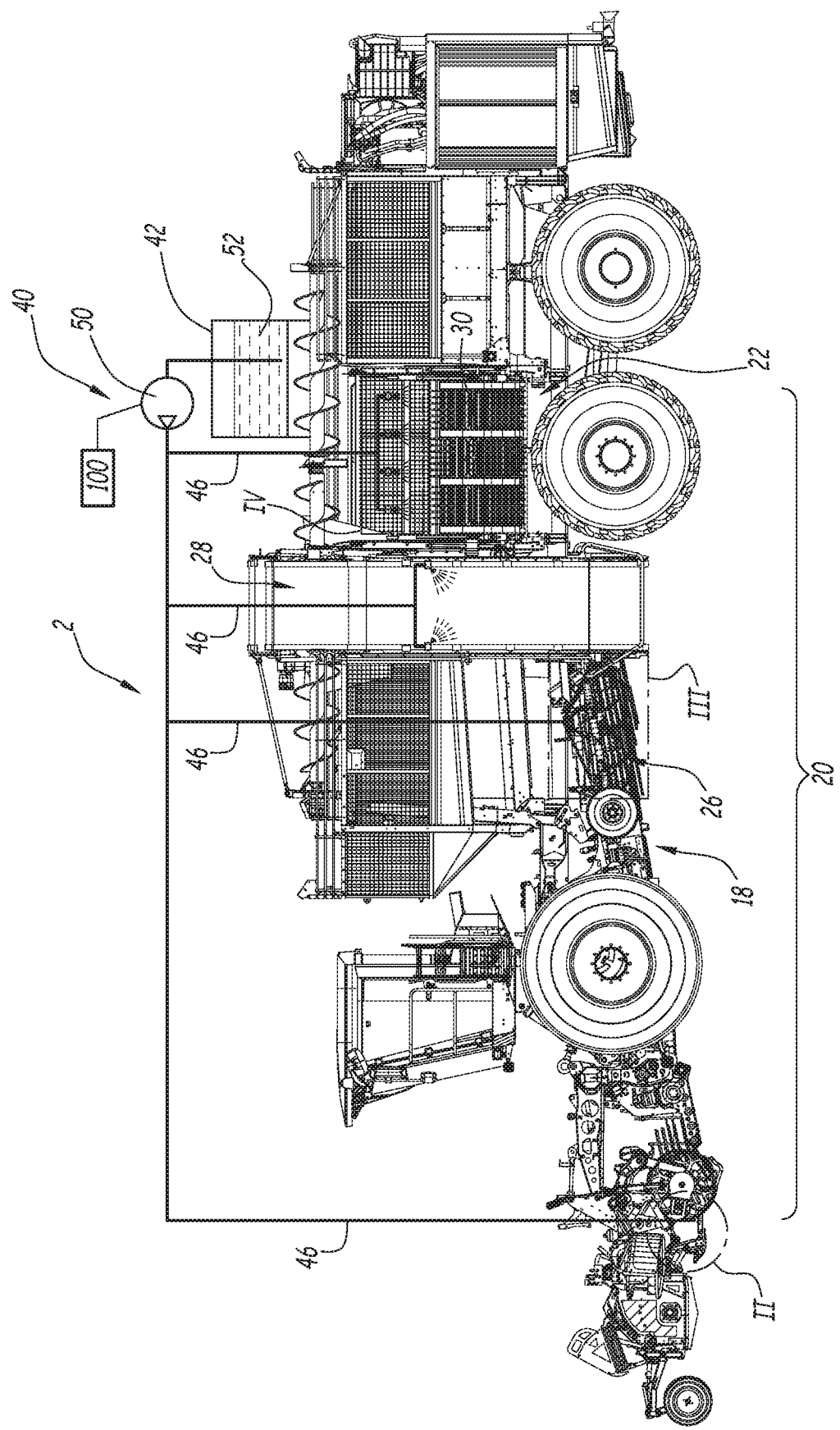
FIG. 1 is a schematic lateral view of a harvesting machine according to the invention.

FIG. 1 shows a root crop harvesting machine according to the invention, designated by the general reference 2.

The root crop harvesting machine 2 is adapted to harvest root crop 4, in particular beet crop, and most preferably sugar beets. Alternatively, the root crop harvesting machine is adapted to harvest other root crop, such as potatoes or carrots.

Figure 2:
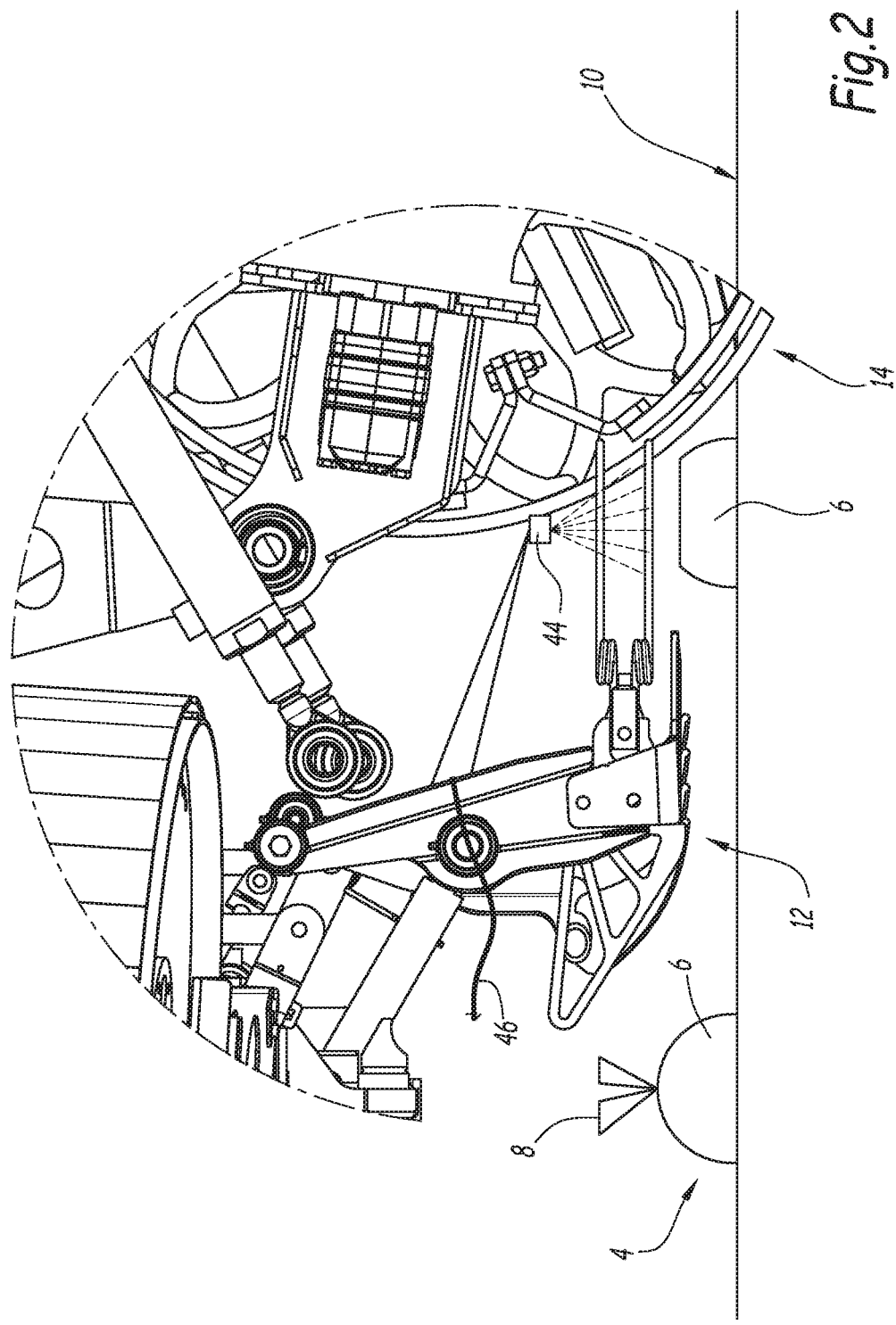
FIG. 2 is the detail II of FIG. 1, at greater scale.

The root crop 4 has a root portion 6 and foliage 8. The root portion 6 is, before harvesting, partially embedded in soil 10 (see FIG. 2).

The root crop harvesting machine 2 comprises a defoliating cutting device 12 and an uprooting device 14 adapted to uproot the root crop 4.

The root crop harvesting machine 2 is adapted to defoliate a given root crop 4 with the defoliating cutting device 12 before the given root crop is uprooted by the uprooting device 14. In other terms, the root crop harvesting machine is adapted to cut off the foliage 8 off the root portion 6 before the root portion 6 is uprooted by the uprooting device. The cutting device 12 generates a cutting location 16 on the root portion 6.

Alternatively, the root crop 4 is uprooted by the uprooting device 14 without the foliage 8 being cut off.

Unless specified, in the following the term "root crop 4" is used synonymously with "root portion 6" with the foliage 8 cut off, as either the whole root crop 4 or only the root portion 6 can be harvested.

The root crop harvesting machine 2 comprises a root crop transport device 18 delimiting a transport path 20 of the root crop 4 or of the root portion 6 from the uprooting device to a discharge location 22. The discharge location 22 is a location on the root crop harvesting machine 2 where the root crop 4 or the root portion 6 can be discharged onto a root crop heap (not shown).

The root crop harvesting machine comprises furthermore a root crop storage container 24.

The root crop transport device 18 comprises a sieve 26, in the present case a rotary sieve, adapted to clean the root crop 4 from soil and stones. The root crop transport device can also comprise several such sieves 26 in row, so that the root crop 4 passes several sieves.

The root crop 4 is put from the uprooting device 14 onto the sieves 26, eventually via transport and cleaning rollers (not shown).

The root crop transport device 18 comprises at least one conveyor.

In the present case, the root crop transport device 18 comprises one upstream conveyor which is an elevator 28. The root crop transport device 18 comprises one downstream conveyor which is a discharge conveyor 30 adapted to discharge the root crop from the harvesting machine.

The upstream conveyor or elevator is adapted to pick up the root crop 4 from the sieves 26 and to raise the root crop to an input opening of the root crop storage container 24. The upstream conveyor is therefore located in the transport path 20 upstream of the root crop storage container 24.

The downstream conveyor or discharge conveyor 30 is adapted to discharge the root crop 4 stored in the root crop storage container 24 from an outlet opening of this container. The downstream conveyor 30 is therefore arranged in the transport path 20 downstream of the root crop storage container 24.

The root crop harvesting machine 2 comprises furthermore an applicator device adapted to apply one or more agents to the root crop. In the following as an example the applicator device is a sealing applicator device 40 adapted to apply a sealing liquid to the root crop 4.

The sealing applicator device 40 comprises a sealing liquid tank 42 and at least one spray nozzle 44. Each spray nozzle 44 is connected through liquid lines 46 to the sealing liquid tank 42. The sealing applicator device 40 comprises a pump 50 adapted to extract the sealing liquid 52 from the sealing liquid tank 42 and to generate sealing liquid pressure in each spray nozzle 44.

The sealing applicator device 40 comprises also a control 100 for controlling the operation of the pump 50 and/or the operation of each spray nozzle 44.

The sealing liquid tank 42 comprises the sealing liquid 52 adapted to seal the root crop 4.

The sealing liquid 52 comprises or consists of a sealing agent which is for example lime solution or limewater, i.e. a diluted or saturated solution of $Ca(OH)_{2(aq)}$. Limewater as sealing agent is particularly advantageous, as it is compatible with the process of extracting sugar from sugar beets.

The sealing liquid 52, at the locations where it is applied on the root crop 4, forms a film on the root crop 4. This film is a mechanical barrier on the root crop protecting the root crop 4. The sealing liquid 52 forms the film by drying Each spray nozzle 44 is adapted and positioned so as to spray sealing liquid 52 onto the root crop 4, when the spray nozzle 44 is in operation.

According to one aspect, the sealing applicator device 40 is adapted to apply the sealing liquid 52 to the root crop at the cut location of the root crop 4 or the root portion 6, where the defoliating cutting device 12 has cut off the foliage 8. This is advantageous, as the location on the root crop 4 or the root portion 6 where the foliage has been cut off, represents generally the greatest surface on the root crop which has been damaged. To this end, the sealing applicator device 40 is adapted to apply the sealing liquid 52 on the given root crop after the defoliating by the defoliating device 12 and before the uprooting by the uprooting device 14. In this manner, the cut location of the root crop 4 has a defined position and the sealing liquid 52 is applied with little loss. The spray nozzles 44 of the sealing applicator device 40 are arranged between the defoliating device 12 and the uprooting device (see FIG. 2).

According to another aspect, the sealing applicator device 40 is adapted to apply the sealing liquid to the root crop 4 located or while being conveyed on the root crop transport device 18 on the transport path 20.

Figure 3:
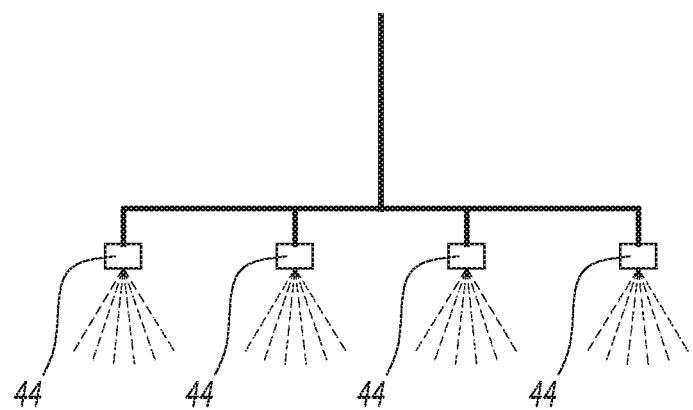
FIGS. 3 and 4 are the details III and IV at greater scale.

In particular, the sealing applicator device 40 is adapted to apply sealing liquid 52 to the root crop 4 while the root crop is located or while being conveyed on the sieve 26 (see FIG. 3). To this end, spray nozzles 44 are arranged on the harvesting machine 2 and directed toward the sieve 26. This location is advantageous, as the sieve has a small width and a relatively small number of spray nozzles is necessary to cover the crop.

According to a further aspect, the sealing applicator device 40 is adapted to apply sealing liquid 52 to the root crop located on or being transported on one or more of the conveyors 28, 30.

In the present embodiment, the sealing applicator device 40 is adapted to apply sealing liquid 52 to the root crop located on or being transported by the elevator 28. The transport path 20 has two sides, a front side and a rear side, which are the sides extending over a width of the transport path, and the sealing applicator device 40 is adapted to apply sealing liquid on both of these sides to the root crop 4 located on the transport path.

To this end, spray nozzles 44 are arranged on the front side and on the rear side of the transport path 20, respectively of the elevator 28, and are directed toward the transport path.

Applying sealing liquid to the root crop 4 in the elevator 28 is advantageous as the root crop are spread out in the elevator 28 and each root crop 4 can be sealed.

Figure 4:
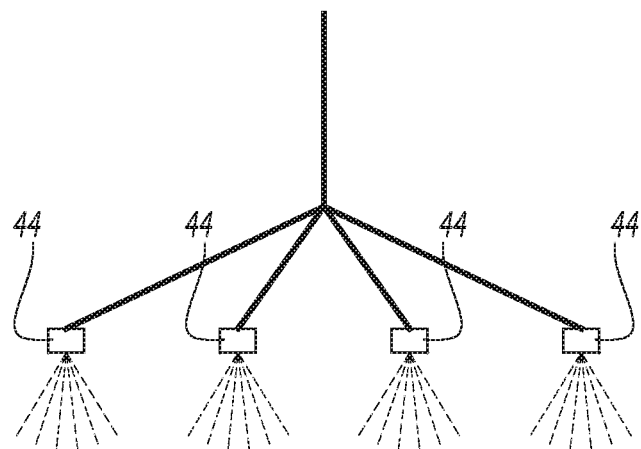

According to a final aspect, in the present embodiment, the sealing applicator device 40 is adapted to apply sealing liquid 52 to the root crop located on or being transported by the discharge conveyor 30 (see FIG. 4). To this end, spray nozzles 44 are arranged on the harvesting machine 2 so that they are directed to the discharge conveyor 30, at least when the discharge conveyor 30 is in a discharge position. During operation, the spray nozzles 44 spray sealing liquid onto the beet crop 4 located on the discharge conveyor 30.

Applying sealing liquid to the root crop 4 on the discharge conveyor 30 is advantageous as the root crop are shortly before being put on the crop heap and most of the damaged area of the root crop 4 can be sealed.

During use of the root crop harvesting machine 2 the following steps are executed:
  a sealing liquid is applied on the root crop 4, and
  the sealing liquid applied to the root crop is let take effect, in particular dried or set or reticulated.

The present embodiment discloses spray nozzles at different locations of the harvesting machine 2 according to the above aspects. It is to be understood that the sealing applicator device can also embody only one or several of these aspects in any possible combination, according to the circumstances. For example, the sealing applicator device could only be adapted to apply sealing liquid at the discharge location.

Alternatively, the sealing liquid is replaced by any other agent adapted to treat the root crop or such other agent is used to treat the root crop before sealing or instead of sealing. The agent adapted to treat the root crop is in particular adapted to seal the root crop.

The agent can be a solid agent, a liquid agent or a gaseous agent or any mixture of these three agents. For example, the agent can be air, sand and/or earth or any mixture of these. The application of these agents permits drying the beet crop so it will be easier to clean the beet crop during the workflow on the harvesting machine.

The agent can be a gas, a mixture of gas, such as air, or a solid substance, such as powder. For example chalk powder is applied to the root crop.

Alternatively, the agent can be pure water, without any additives, and can be used to clean the beet crop.

Still alternatively, the agent can be water and an additive, in particular chalk, adapted to protect the beet crop.

The applicator device generally is an agent applicator device adapted to apply one agent or apply successively two or more agents to the root crop, for example three agents adapted to treat the root crop. In case more than one agent adapted to treat the root crop is applied, a first agent can be a drying and/or cleaning agent, such as air or water. A second agent can be a drying and/or cleaning agent, such as air or water. A third, and preferably last, agent can be a sealing agent. The sealing agent can be limewater.

The first agent is applied to the root crop after it has been uprooted, then the second agent is applied to the root crop, and subsequently the third agent is applied to the root crop. The applicator device generally comprises spray nozzles for applying each of the agents to the root crop and in particular for applying the first, second and third agents.

The agents used are chosen according to the particular needs of the root crop and the harvesting conditions.

For example, during a first step after extraction of the root crop the earth on the root crop is dried, the first agent being for example air, then the root crop is cleaned by liquid, the second agent being for example water. Subsequently, at the end of the process, an agent of protection is sprayed onto the root crop, the third agent being a sealing agent.

Another example is in the first step cleaning the root crop with a spray of water, in a second step drying the root crop with air and in a third step protecting the root crop by applying sealing liquid.

According to a further feature, the root crop harvesting machine is adapted to defoliate a given root crop with the defoliating cutting device (12) before the given root crop is uprooted by the uprooting device (14), and wherein the applicator device (40) is adapted to apply the agent on the given root crop after the defoliating by the defoliating cutting device (12) and before the uprooting by the uprooting device (14).

LIST OF REFERENCES

2 Harvesting machine
4 root crop/sugar beets
6 root portion
8 foliage
10 soil
12 defoliating cutting device
14 uprooting device
16 cutting location
18 root crop transport device
20 transport path
22 discharge location
24 root crop storage container
26 sieve
28 upstream conveyor/elevator
30 downstream conveyor/discharge conveyor
40 sealing applicator device
42 sealing liquid tank
44 spray nozzle
48 liquid line
50 pump
52 sealing liquid

What is claimed is:

1. A root crop harvesting machine for harvesting a root crop that comprises a root portion and foliage, the root crop harvesting machine comprising:
   a defoliating cutting device adapted to defoliate the root crop by cutting off the foliage of the root crop and thereby resulting in the defoliated root crop having at least one cut location;
   an uprooting device adapted to uproot the root crop; and
   an applicator device adapted to apply an agent to the defoliated root crop at the at least one cut location;
   wherein the agent is selected from the group consisting of a sealing liquid, a gas, a mixture of gases, a powder, and a mixture of gas(es) and powder.

2. The root crop harvesting machine according to claim 1, wherein the applicator device comprises at least one spray nozzle for applying the agent to the root crop.

3. The root crop harvesting machine according to claim 2, wherein the applicator device further comprises an agent tank for containing the agent, wherein the agent tank is connected to the at least one spray nozzle.

4. The root crop harvesting machine of claim 1, wherein the agent is a sealing liquid and the applicator device is adapted to apply the sealing liquid on the given root crop after the defoliating by the defoliating cutting device and before the uprooting by the uprooting device.

5. The root crop harvesting machine of claim 4, wherein the applicator device comprises at least one spray nozzle for applying the sealing liquid to the root crop, and said at least one spray nozzle is arranged between the defoliating cutting device and the uprooting device.

6. The root crop harvesting machine according to claim 1, wherein the agent is a sealing liquid comprising an aqueous $Ca(OH)_{2(aq)}$ solution.

7. The root crop harvesting machine according to claim 1, wherein the agent is a sealing liquid adapted to form a film by drying on the defoliated root crop at the at least one cut location.

8. The root crop harvesting machine according to claim 1, wherein the root crop harvesting machine further comprises a root crop transport device defining a transport path of the root crop from the uprooting device to a discharge location of the harvesting machine where the root crop is discharged from the harvesting machine; and
   wherein the applicator device is adapted to apply the agent to the root crop located on the transport path.

9. The root crop harvesting machine according to claim 8, wherein the root crop transport device further comprises a conveyor; and
   wherein the applicator device is adapted to apply the agent to the root crop located on or being transported on the conveyor.

10. The root crop harvesting machine according to claim 8, wherein the root crop transport device further comprises a sieve; and
    wherein the applicator device is adapted to apply agent to the root crop while the root crop is located on the sieve.

11. The root crop harvesting machine according to claim 10, wherein the sieve is a rotary sieve.

12. The root crop harvesting machine according to claim 9, wherein the conveyor is an elevator.

13. The root crop harvesting machine according to claim 12, wherein the elevator is arranged in the transport path upstream of a root crop storage container.

14. The root crop harvesting machine according to claim 9, wherein the conveyor is a discharge conveyor adapted to discharge the root crop from the harvesting machine.

15. The root crop harvesting machine according to claim 14, wherein the discharge conveyor is arranged downstream of a root crop storage container.

16. The root crop harvesting machine according to claim 9, wherein the transport path has two sides and the applicator device is adapted to apply the agent on both sides to the root crop located or transported on the transport path.

17. A method of harvesting and treating a root crop with an agent, the method comprising:
    uprooting the root crop with an uprooting device of a root crop harvesting machine;
    defoliating the root crop by cutting off the foliage of the root crop with a defoliating cutting device of a root crop harvesting machine, resulting in the defoliated root crop having at least one cut location; and
    applying the agent to the defoliated root crop, at the at least one cut location, with an applicator device of the root crop harvesting machine, wherein the agent is selected from the group consisting of a sealing liquid, a gas, a mixture of gases, a powder, and a mixture of gas(es) and powder;
    thereby harvesting and treating the root crop with the agent.

18. The method of harvesting and treating a root crop with an agent according to claim 17, wherein said uprooting the root crop is performed after said defoliating the root crop and after said applying the agent.

19. The method of harvesting and treating a root crop with an agent according to claim 17, wherein the agent is a sealing liquid, and said applying the agent causes the sealing liquid to form a film by drying on the defoliated root crop at the at least one cut location.

20. The method of harvesting and treating a root crop with an agent according to claim 17, wherein the agent is a sealing liquid comprising an aqueous $Ca(OH)_{2(aq)}$ solution.

\* \* \* \* \*